G. E. REYNOLDS.
Improvement in Doors for Puddling and other Furnaces.
No. 131,562.    Patented Sep. 24, 1872.
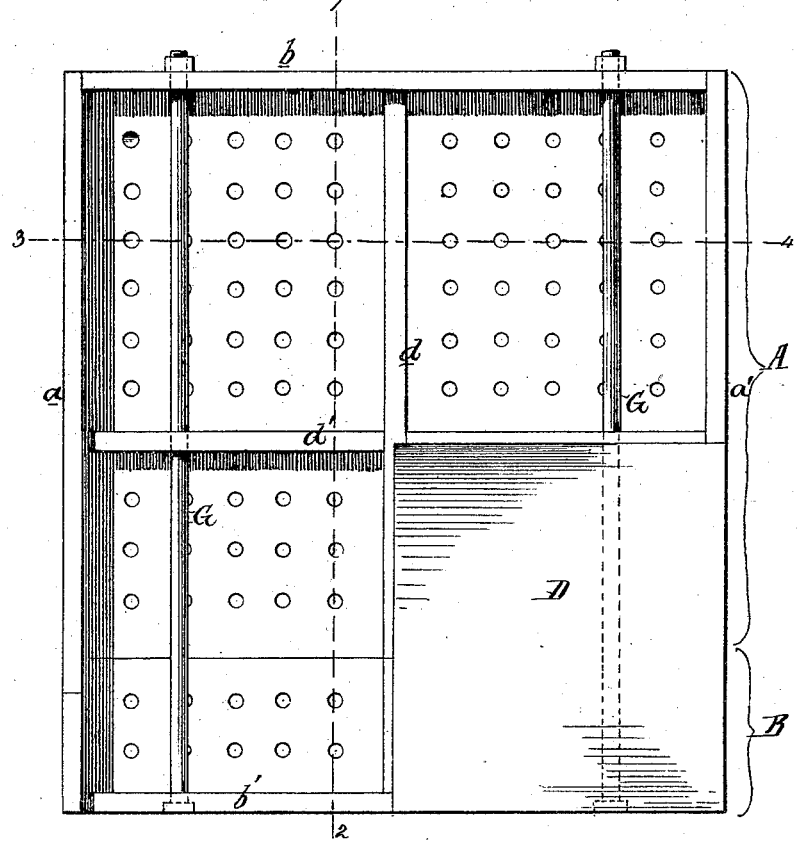
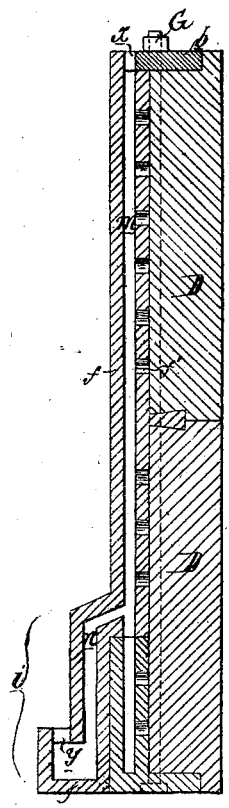
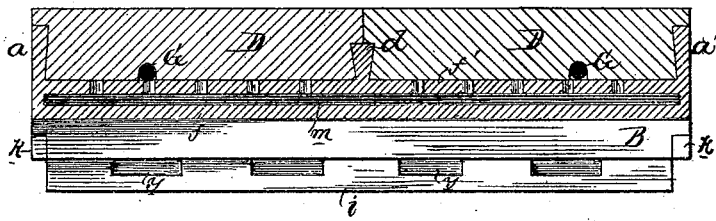
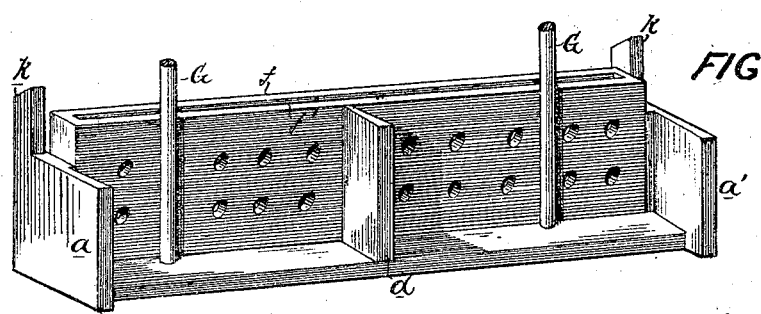
Witnesses,
Jno. B. Harding.
Thos. McIlvain.
Geo. E. Reynolds
By his attys.
Howson & Son

UNITED STATES PATENT OFFICE.

GEORGE E. REYNOLDS, OF PHILADELPHIA, PENNSYLVANIA.

IMPROVEMENT IN DOORS FOR PUDDLING AND OTHER FURNACES.

Specification forming part of Letters Patent No. 131,562, dated September 24, 1872.

*To all whom it may concern:*

Be it known that I, GEORGE E. REYNOLDS, of Philadelphia, county of Philadelphia and State of Pennsylvania, have invented Improvements in Furnace-Doors, of which the following is a specification:

My invention relates to improvements in the doors of puddling and other furnaces; my improvements, which are too fully explained hereafter to need preliminary description, having for their object the preservation of the doors from the destructive effects of the heat to which they are exposed, and facilities for repairing a partially-destroyed door without discarding the whole.

In the accompanying drawing, Figure 1 is a view of the rear of my improved furnace-door; Fig. 2, a vertical section on the line 1 2, Fig. 1; Fig. 3, a sectional plan on the line 3 4, Fig. 1; and Fig. 4, a perspective view of the detachable base of the door.

The frame of my improved furnace-door is made of cast-iron and is composed of two parts—namely, the main or upper portion A and the base or lower portion B—the two parts united forming the frame of the door, which is strengthened by the opposite side flanges $a$ and $a'$, the bottom flanges $b'$, and further by the ribs $d$ and $d'$ crossing each other, as shown in Fig. 1, and forming, with the above-mentioned flanges and with the detachable top plate $b$, four compartments at the back of the frame for receiving the four blocks D of baked fire-clay or other refractory material. I prefer to dovetail these blocks to the frame, as best observed in Fig. 3, by referring to which it will be noted that the side flanges $a$ and $a'$ are beveled and adapted to the beveled edges of the blocks, the two upper blocks being inserted from above, (after detaching the plate $b$,) and being arrested by the cross-rib $d'$, and thereby retained. The lower blocks are inserted from below after detaching the lower portion B of the door, this lower portion being subsequently readjusted to the upper portion A and to the blocks, bolts G G being passed through the flange $b'$ of the lower portion of the door and through the plate $b$ which bears upon the blocks, so that on screwing down the nuts of these bolts not only are the two portions of the door effectually secured together, but the blocks are firmly held in their places. It will be seen that these blocks are so formed as to overlap the flanges and ribs of the cast-iron frame, and so that one block shall be in contact with adjoining blocks; the rear of the door is thus entirely covered with refractory material, and no portion of the frame is exposed to the direct heat of the furnace. The front of the door-frame is composed of two plates, $f$ and $f'$, the former or exterior plate being plain, and the latter being perforated with a number of holes, there being between the two plates a space, $m$, to which a blast of cold air from above can be introduced through an opening or openings, $x$, the air escaping below through openings $y\ y$. The peculiar construction of this lower portion B of the door-frame will be best observed on reference to Figs. 2 and 4. The front of this portion consists of two plates, which, when the two parts of the frame are fitted together, form continuations of the plates $f$ and $f'$, the air-space $m$ being also contained between the plates of the lower portion of the frame, and the latter fits against and is overlapped by the projecting portion $i$ of the upper part of the frame, as seen in Fig. 2, this projecting portion having also an air-space, $n$, which communicates with the space $m$. Lugs $k\ k$ on the lower portion of the door-frame overlap the upper portion, and serve as guides in adjusting the lower portion and retaining it in its proper position.

No portions of puddling and heating furnaces are destroyed by excessive heat more rapidly than the doors, and the lower portion of the door is much more quickly destroyed than the upper portion; hence the importance of making the lower portion of the door-frame detachable, as in my invention, so that it can be readily detached and replaced by a new portion, the necessity of discarding the whole door as useless being thus obviated. Another important feature of my invention, and one which tends to the preservation of the door-frame, is the space $m$ between the two plates $f$ and $f'$. Owing to the perforations of the latter plate the blocks D will be exposed to the blast of cold air passing through the space $m$, the frame itself, including the lower portion B, being subjected to the same cooling influences, which must necessarily have a tendency to resist the destructible heat of the furnace.

I claim as my invention—

1. A furnace-door made of two portions, the lower of which is detachable from the upper, substantially in the manner described.

2. A furnace-door in which a perforated plate, $f'$, is arranged between the refractory blocks and the air-space, substantially as and for the purpose set forth.

3. The combination, substantially as described, of the upper portion A and lower portion B of the frame, the refractory blocks, the plate $b$, and the bolts G for securing the whole together.

4. The air-passage $n$ in the lower portion B of the door-frame, communicating with the air-passage $m$ of the upper portion A of the said frame, substantially as described.

In testimony whereof I have signed my name to this specification in the presence of two subscribing witnesses.

GEORGE E. REYNOLDS.

Witnesses:
 WM. A. STEEL,
 JOHN K. RUPERTUS.